Aug. 25, 1964  P. MASSARDI  3,145,536
VACUUM TYPE POWER UNIT FOR MOTOR VEHICLES
HYDRAULIC BRAKE SYSTEMS
Filed Sept. 4, 1962
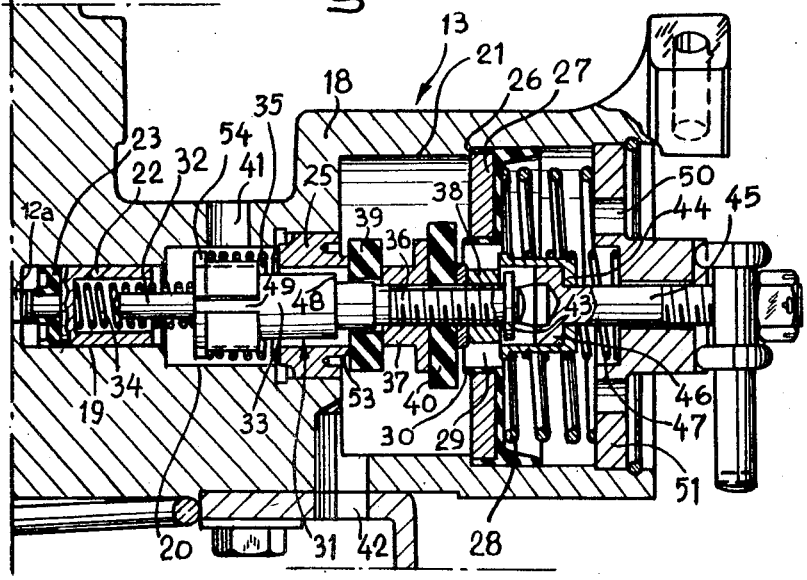
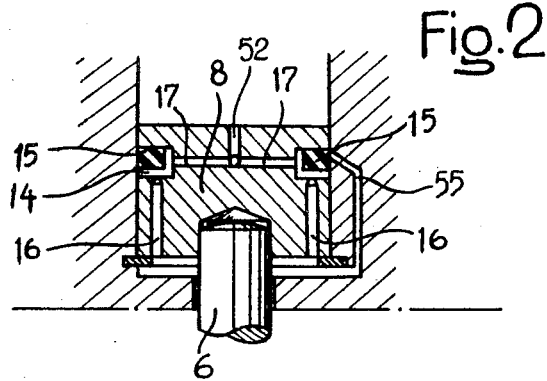
INVENTOR
BY
ATTORNEY

United States Patent Office 3,145,536
Patented Aug. 25, 1964

---

3,145,536
VACUUM TYPE POWER UNIT FOR MOTOR VEHICLES HYDRAULIC BRAKE SYSTEMS
Paolo Massardi, 118 Corso Dante, Turin, Italy
Filed Sept. 4, 1962, Ser. No. 221,064
Claims priority, application Italy Sept. 14, 1961
1 Claim. (Cl. 60—54.5)

This invention relates to a vacuum type power unit for motor vehicles hydraulic brake systems of the type comprising a vacuum actuated power cylinder including a piston carrying a rod, adapted to act against the action of resilient means on a piston slidable in a servo operated master hydraulic cylinder connected to the conventional brake pump and to wheel cylinders enclosing the pistons actuating the brake shoes.

Means for connecting said hydraulic cylinder to the hydraulic brake master cylinder and means for connecting the source of vacuum to the said vacuum actuated power cylinder are known in the art.

In actual practice such connections were found to be objectionable under various aspects, and particularly braking was found to be too sharp when the power unit, which is activated by the hydraulic fluid pressure transmitted from the master cylinder, comes into action.

In order to obviate such drawbacks this invention provides a power unit of the type referred to, wherein a valve incorporated by the piston of the servo operated master hydraulic cylinder connects the manually operated master cylinder with the servo operated master hydraulic cylinder compression chamber and wherein a pneumatic valve arrangement carried by the vacuum distributor and controlled by calibrated valves affords a gradual smooth braking through successive activating and deactivating, respectively, of the power unit operation.

Further characteristic features and advantages of this invention will be understood from the appended detailed description referring to the accompanying drawings, which are given by way of example, and wherein:

FIGURE 2 is a detail view of FIGURE 1 on an enlarged scale showing the valve incorporated by the piston of the servo operated master hydraulic cylinder;

FIGURE 3 is a detail view of FIGURE 1 on an enlarged scale showing the vacuum distributor.

Figure 1:
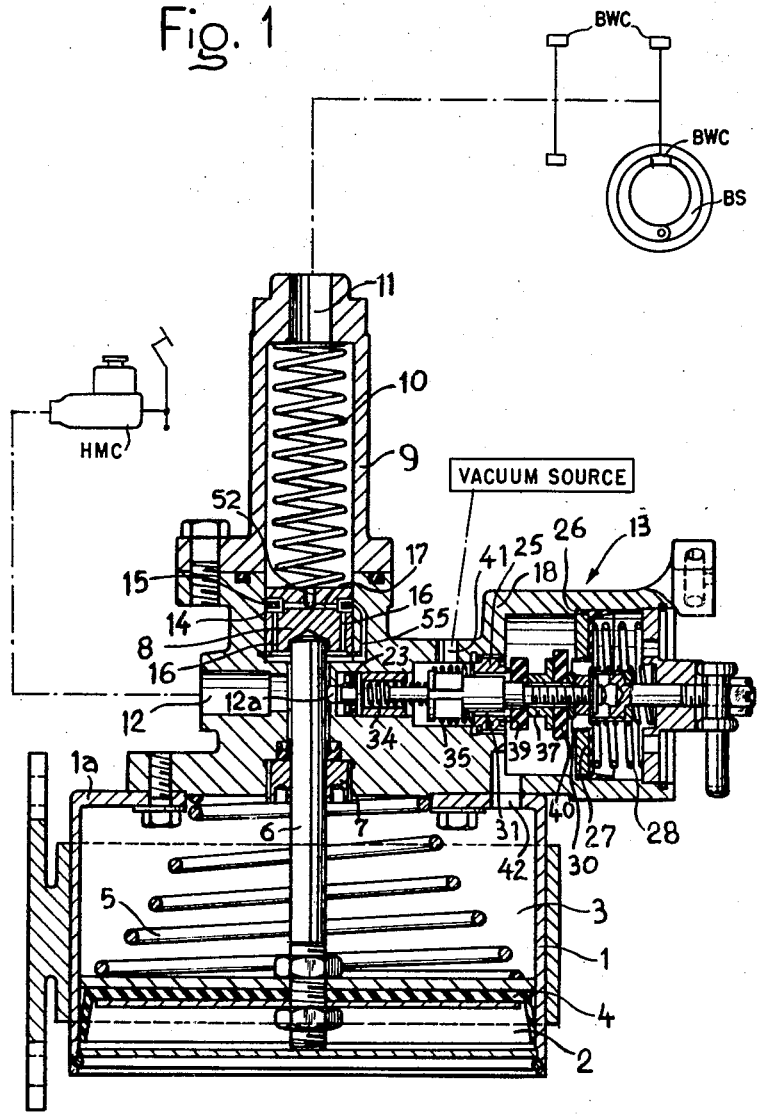
FIGURE 1 is an axial sectional view of the improved power unit and a schematic showing of its relationship in a hydraulic brake system including wheel brakes, wheel cylinders, and a manually operated master cylinder.

A vacuum actuated power cylinder 1 is subdivided into chambers 2 and 3 by a piston 4 movable in the cylinder against the action of a spring 5.

The piston 4 has rigidly connected thereto a rod 6 which extends within a gasket 7 through the end 1a of the cylinder 1 into contact with a piston 8 movable in a servo actuated hydraulic master cylinder 9 against the action of a spring 10.

The cylinder 9 is subdivided by piston 8 into two portions, the cylinder portion beneath the piston being connected through intake duct 12 to a conventional hydraulic master cylinder HMC.

The cylinder portion situated above the piston 8 forms a compression chamber and has an outlet port 11 leading to the brake wheel cylinders BWC enclosing pistons operating the brake shoes BS.

The duct 12 extends beyond the rod 6 into a narrow conduit 12a supplying the hydraulic fluid under pressure to a vacuum distributor 13. On being activated by the hydraulic fluid the vacuum distributor 13 connects the portion 3 of the power cylinder 1 with a vacuum source, such as the intake manifold vacuum of the motor vehicle engine.

The piston 8 is shown in detail in FIG. 2 and is formed with an annular groove 14 having loosely fitted therein an annular packing 15 of resilient material which closely adheres to the walls of the cylinder 9.

Holes 16 bored in the piston 8 parallel with the piston axis connect the portion of the cylinder 9 beneath the piston 8 with the groove 14.

Further radial holes 16 bored in the piston 8 at the groove 19 open into an axial blind bore 52 opening towards the compression chamber of the cylinder 9.

With this arrangement through the provision of holes 16, 17 and 52 the hydraulic fluid flowing from the master cylinder HMC through the duct 12 reaches the cylinder 9 and in the absence of any action of the rod 6 on the piston 8, the seal 15 floats in the annular groove 14 without hindering hydraulic fluid supply to the cylinder 9.

As the rod 6 begins to exert thrust on the piston 8 on connection by the distributor 13 of the vacuum cylinder 1 with the vacuum source, the piston 8 is moved against the action of the spring 10 and the seal 15 bears on and closes the openings of the holes 16.

Under such conditions the combined forces of the rod 6 and hydraulic fluid under pressure delivered by the master cylinder through duct 12 act on the piston 8 from beneath.

This combined force results in a rise in pressure of the hydraulic fluid in the hydraulic compression chamber of the cylinder 9, thereby affording the desired increase in hydraulic fluid pressure.

A release conduit 55 bored within the cylinder 9 connects the groove 14 with the portion of the cylinder 9 beneath the piston 8 in order to assist in releasing the seal 15 from the openings of the holes 16 as pressure on the vehicle brake pedal is released.

The distributor 13 essentially comprises a cylinder 18 of various diameters, axially aligned with the inlet duct 12.

In this specification the terms "right" and "left" refer to the corresponding parts as seen on looking at the drawing.

A piston 22 provided with a seal 23 facing the conduit 12a is movable within the left-hand portion 19 of smaller diameter of the cylinder 18.

The intermediate portion 20 of the cylinder 18 connects through a conduit 41 with the vacuum source and has secured to the inside of its right-hand end a sleeve 25 provided with an annular seat 53.

The larger diameter right-hand portion 21 of the cylinder 18 opens to the outside atmosphere through holes 50 bored in a disc 51 closing the right-hand end of the portion 21. Cylinder portion 21 is provided on its inner surface at about mid length thereof with an inner annular shoulder 26 acting as an abutment for a tight-sealing piston 27 movable within the portion 26 of the cylinder 18 on the right of the shoulder 26, and biased against the latter by a spring 28.

The piston 27 has bored through its middle portion a hole 29 receiving the tubular central hub of the cup-shaped resilient packing 30 of the piston 27.

The free end of packing 30 projects from opening 29 and forms an annular resilient seat 30a at the side of the piston 27 facing the annular seat 53.

A stepped rod 31 comprises starting from the left towards the right a shank 32 having fitted thereon a coil spring 34, a larger diameter head portion 33 having fitted thereon a coil spring 35 and a spigot 36 screw threaded at its right-hand end.

The rod 31 is shorter than the cylinder 18 of the distributor 13 and is so positioned within the cylinder such that the head 33 is accommodated by the portion 20, the threaded spigot 36 being received by the portion 21 of the cylinder 18.

The spring 34 is stressed between the piston 22 and the head portion 33.

The spring 35 abuts on the left an annular shoulder 54 on the head 33 and on the right the inner edge of the sleeve 25 which is screwed into the cylinder 18 and has loosely extending therethrough the spigot 36.

The spigot 36 has fitted thereon a first movable sealing ring 39 and a further sealing ring 40 secured to the spigot between a screw threaded collar 37 and a nut 38 screwed on the spigot.

The ring 39 which tightly slides between an annular shoulder 48 on the rod 31 and the threaded collar 37 faces the seat 53, the ring 40 facing the seat 30a on the periphery of the hole 29 through which the spigot 36 extends beyond the piston 27 and has extending therethrough at this end a pin 43.

The seat 53 in the sleeve 25 and sealing ring 39 as well as the seat 30a and sealing ring 40 act as air valves, the valve members of which are both mounted on the rod 31 by which they are controlled.

A conduit 42 connects the portion 21 of the cylinder 18 with the chamber 3 of the cylinder 1.

A rod 45 has a head portion 46 and is axially aligned with the spigot 36. The rod is movable in an axial bore in the disc 51 through which it reaches outwardly by its end opposite its end carrying the head portion 46, which is spaced from the spigot 36.

A sleeve 44 slidably fitted on the head portion 46 and end of the spigot 36 and a coil spring 47 supported by the sleeve resiliently interconnect in a known manner the rod 31 and rod 45, the rod movements to the right only being transmitted to the rod 31.

Four longitudinal ridges 49 are formed in the outer surface of the head portion 33.

In the inoperative condition as shown on the drawing, the opposite action of the springs 34 and 35 holds the rod 31 displaced to the left, whereby the sealing ring 39 which is pushed by the threaded collar 36 abuts the seat 53 of the sleeve 25 and is removed from the shoulder 48.

At the same time the piston 27 which is urged by the spring 28 bears against the shoulder 26, the sealing ring 40 being removed from the seat 30a.

In this condition the spacing of the ring 39 from the shoulder 48 exceeds the spacing of the ring 40 and seat 30a.

With this arrangement the chamber 3 of the cylinder 1 connects with the outside through the pipe 42, seat 30a, hole 29 and holes 50.

By depressing the vehicle brake pedal the piston 22 is forced by the hydraulic fluid to the right and transmits the thrust to the rod 31 through spring 34. When the thrust is sufficient to overcome the action of the opposing forces, the rod 31 performs a movement to the right.

Over the first portion of this movement the rod 31 slides in the ring 39, the shoulder 48 approaching the ring 39 without contacting it, while the ring 40 has contacted the end closing the seat 30a.

On completion of the first portion of the stroke the ring 39 still contacts the seat in the sleeve 25 by the action of vacuum and effects a double seal on the seat and spigot on the rod 31, the chamber 3 of the cylinder 1 being cut off from the outside and vacuum source, though it maintains in its inside the atmospheric pressure.

Over the second portion of the stroke the shoulder 48 contacts the spring 39 without removing it from the sleeve 25, the ring 40 pressing upon the seat 30a and moving the piston 27 to the right.

On completion of the second portion of the stroke the position of the ring 39 is unchanged as well as the pressure in the chamber 3 of the cylinder 1.

Over the third portion of the stroke the shoulder 48 pushes the ring 39 and removes it from the sleeve 25, the ring 40 moving the piston 27 further to the right. On completion of the stroke the chamber 3 of the cylinder 1 connects with the source of vacuum through conduit 41, the passage between the ring 39 and the seat in the sleeve 25 and pipe 42, connection of the chamber 3 with the outside being cut out inasmuch as the passage through seat 30a is closed by the ring 40.

The braking action is thereby increased.

In the condition corresponding to the end of the third portion of the stroke the rod 31 is urged to the right by the spring 34 and to the left by the spring 35, under vacuum acting on the piston 27 and reaction of the spring 28.

The vacuum force suddenly comes into action on opening of the passage through the seat in the sleeve 25 and destroys the balance established between the forces of the springs 34, 35 and 28, whereby the piston 27 and rod 31 are moved to the left, the shoulder 48 on the rod 31 being removed from the ring 39 which is freely exposed to vacuum and drawn towards the seat in the sleeve 25 which is thereby closed.

The chamber 3 of the cylinder 1 is cut off from the outside and vacuum source and maintains the underpressure established therein the moment the ring 39 has been drawn against the sleeve 25.

These steps are repeated in succession until fresh balance is found which is established by a graduation in the braking action.

On further movement to the right of the rod 31 upon an increase in the effort on the brake pedal, the piston 27 is moved further to the right and stresses the spring 28, the ring 39 being at the same time moved to the right till the shoulder 48 passes the seat in the sleeve 25 preventing return of the ring 39 against said seat.

Connection between the vacuum source and chamber 3 of the cylinder 1 now permanently established, graduation in the braking action is annulled.

The rod 45 acts to couple in a known manner the pneumatic braking members directly without involving the hydraulic braking members in case of failure of the latter.

The ridges 49 act to freely pass vacuum from one side of the head portion 33 to the other when the spring 35 upon compression draws its turns close to one another to form a sleeve like member.

What I claim is:

In a power assisted hydraulic braking system of the type comprising a manually operated primary master cylinder and wheel brake cylinders, a secondary servo-actuated master cylinder inserted between said primary master cylinder and said brake cylinders, a pneumatic motor unit operated by a pneumatic pressure difference, acting on the secondary master cylinder and setting up from a primary hydraulic pressure, an amplified secondary hydraulic pressure, and a control valve responsive to said primary hydraulic pressure and connecting said pneumatic motor unit with the atmosphere when the braking system is inoperative and with a vacuum source when the primary hydraulic pressure reaches a predetermined value; the said valve comprising; a casing with three aligned chambers, a piston slidably mounted in a bore provided in said casing and having one face exposed to the action of said primary hydraulic pressure, a stepped rod valve stem coaxial with said piston and extending through the three aligned chambers provided in said casing, the first of which is constantly connected with a source of vacuum and communicates with said bore in which said piston slides, the second chamber being constantly connected with said pneumatic motor, and the third chamber being constantly connected to the atmosphere, a movable wall interposed between said second and third chamber, said wall being slidable in said third chamber, a spring being provided for urging said movable wall towards said second chamber and a stop for limiting the displacement of said wall towards the second chamber, a first valve comprising a valve ring arranged in said second chamber and slidably mounted between two radial shoulders on said stepped rod and cooperating with an annular valve seat interposed between said first and second chambers, a second valve comprising a valve ring arranged in said second chamber and fastened to said stepped rod and cooperating with an annular valve seat mounted in said movable wall interposed between said third and second chamber, a first spring interposed between said stepped rod and said piston and a second spring interposed between said stepped rod and said casing and urging said rod towards said piston, the said two springs maintaining said rod when the primary pressure has not reached a predetermined value, in a position in which the first valve is closed and the second is open, and in which the radial shoulders on said rod are so arranged with respect to said valve ring and the annular seat of the first valve that upon displacement of the stepped rod towards said third chamber before opening of the communication between said first and second chamber closure of said second valve and a displacement of said movable wall away from the stop limiting its stroke towards said second chamber occur.

References Cited in the file of this patent

UNITED STATES PATENTS

| | | |
|---|---|---|
| 2,654,224 | Price | Oct. 6, 1953 |
| 2,670,603 | Allin et al. | Mar. 2, 1954 |
| 2,853,977 | Sadler | Sept. 30, 1958 |
| 2,872,905 | Chouings | Feb. 10, 1959 |